(12) United States Patent
Abe (10) Patent No.: US 6,459,691 B1
(45) Date of Patent: Oct. 1, 2002

(54) SYSTEM FOR COMMUNICATION BETWEEN SUB-TRANSMISSION UNITS UNDER CONTROL OF MAIN TRANSMISSION UNIT

(75) Inventor: Masami Abe, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/200,962

(22) Filed: Nov. 30, 1998

(30) Foreign Application Priority Data

Dec. 10, 1997 (JP) .............................. 9-339806

(51) Int. Cl.[7] .............................. H04J 13/02
(52) U.S. Cl. ........................ 370/335; 370/337
(58) Field of Search .............................. 370/328, 432, 370/437, 313, 311, 337, 347, 441, 479, 522, 528, 335, 342; 455/343, 434, 522; 375/130, 135, 136, 140, 146, 147

(56) References Cited

U.S. PATENT DOCUMENTS 5,381,447 A * 1/1995 Ayerst et al. .............. 375/1
5,673,259 A * 9/1997 Quick, Jr. ................. 370/342
6,167,056 A * 12/2000 Miller et al. ............... 370/441

* cited by examiner

Primary Examiner—Chau Nguyen
Assistant Examiner—Duc Duong
(74) Attorney, Agent, or Firm—Rabin & Berdo, P.C.

(57) ABSTRACT

A radio communication system such as a mobile communication system is provided which establishes communications between a main transmission unit and sub-transmission units. The main transmission unit transmits to the sub-transmission units simultaneously a frame including a data slot to which paging data on a call made by one of the sub-transmission units to another is added and a preamble to which a bit stream to be subjected to double spreading is added for informing the sub-transmission units of a call request. Each of the sub-transmission units includes a reproducing circuit reproducing the paging data of the received frame. The reproducing circuit is allowed to operate only when the preamble of the received frame indicates the presence of the paging data.

6 Claims, 7 Drawing Sheets

SYSTEM FOR COMMUNICATION BETWEEN SUB-TRANSMISSION UNITS UNDER CONTROL OF MAIN TRANSMISSION UNIT

BACKGROUND OF THE INVENTION

1. Technical Field of the Invention

The present invention relates generally to a radio communication apparatus including a plurality of sub-transmission units and a main transmission unit controlling communications between the sub-communication units, and more particularly to a radio communication apparatus designed to control standby processing of sub-transmission units waiting for calls.

2. Background Art

As one of radio communication systems, there is a mobile communication system. The mobile communication system consists of a plurality of mobile stations and a base station which monitors and controls communications between the mobile stations. A spread spectrum system is used in the communications for reducing the deterioration of signals due to interference waves and for the security of information.

Regardless of the presence or absence of calls, the base station always transmits signals (referred to as paging signals below) indicative of data on an incoming call (referred to as paging data below) to the mobile stations simultaneously. Upon reception of the paging signal, each mobile station analyzes the paging signal to determine whether the call is given to itself or not.

For example, when one of the mobile stations sends a call request to the base station to call another mobile station, the base station transmits to all the mobile stations the paging signals indicating that the call request has been made. Upon reception of the paging signal, each mobile station analyzes the paging signal to determine whether the incoming call is made to itself or not. One of the mobile stations which has found that the incoming call is made to itself acknowledges to the base station reception of the call. Upon reception of the acknowledgment, the base station allows communication between the calling and called mobile stations.

However, each mobile station in the conventional mobile communication system needs to analyze the paging signal from the base station at all times. The analysis of the paging signal further requires error detection and correction of data contained in the paging signal. The error detection and correction involve complex operations and consumes a large quantity of power. Each mobile station, thus, has the disadvantage that a large quantity of power is consumed at all times in knowing whether a call is made to itself or not.

SUMMARY OF THE INVENTION

It is therefore a principal object of the present invention to avoid the disadvantages of the prior art.

It is another object of the present invention to provide an improved radio communication system capable of establishing transmissions of a main transmission unit and sub-transmission units with a decreased power consumption.

According to one aspect of the present invention, there is provided a radio communication system which comprises a plurality of sub-transmission units and a main transmission unit which transmits to the sub-transmission units simultaneously a frame including a data slot to which paging data on a call made by one of the sub-transmission units to another is added and a preamble to which a bit stream to be subjected to double spreading is added for informing the sub-transmission units of a call request. The main transmission unit includes an adding circuit adding to the preamble first data indicating the presence or absence of the paging data, a double spreading circuit subjecting data located in the preamble to the double spreading, and a transmission circuit transmitting the frame to which the first data is added to the sub-transmission units simultaneously. Each of the sub-transmission units includes a receiving circuit receiving the frame from the main unit, an inverse double spreading circuit subjecting the data located in the preamble within the received frame to inverse double spreading, a decision circuit for deciding whether the first data indicates the presence of the paging data or not, a reproducing circuit reproducing the paging data of the received frame, and a switching circuit turning on the reproducing circuit when the first data indicates the presence of the paging data.

In the preferred mode of the invention, the switching circuit keeps the reproducing circuit turned on during a time when the reproducing circuit receives the data slot containing the paging data.

The main transmission unit further includes an amplifying circuit amplifies the frame. An amplification of the data slot within which the paging data is provided is smaller than that of the data slot within which the preamble and the paging data are not provided.

Data for error correction of the paging data is added to the data slot.

The sub-transmission units are classified into a plurality of groups. The adding circuit adds to the preamble second data indicative of one of the groups to which the other sub-transmission units belong. Only the sub-transmission units belonging to the one of the groups indicated by the second data reproduce the paging data.

The adding circuit adds second data specifying the other sub-transmission units to the preamble. Each decision circuit decides which of the sub-transmission units the second data specifies. Only the reproducing circuits in the other sub-transmission units reproduce the paging data.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention the specific embodiment but are for explanation and understanding only.

In the drawings.

DESCRIPTION OF THE PREFERRED EMBODIMENT

Figure 1:
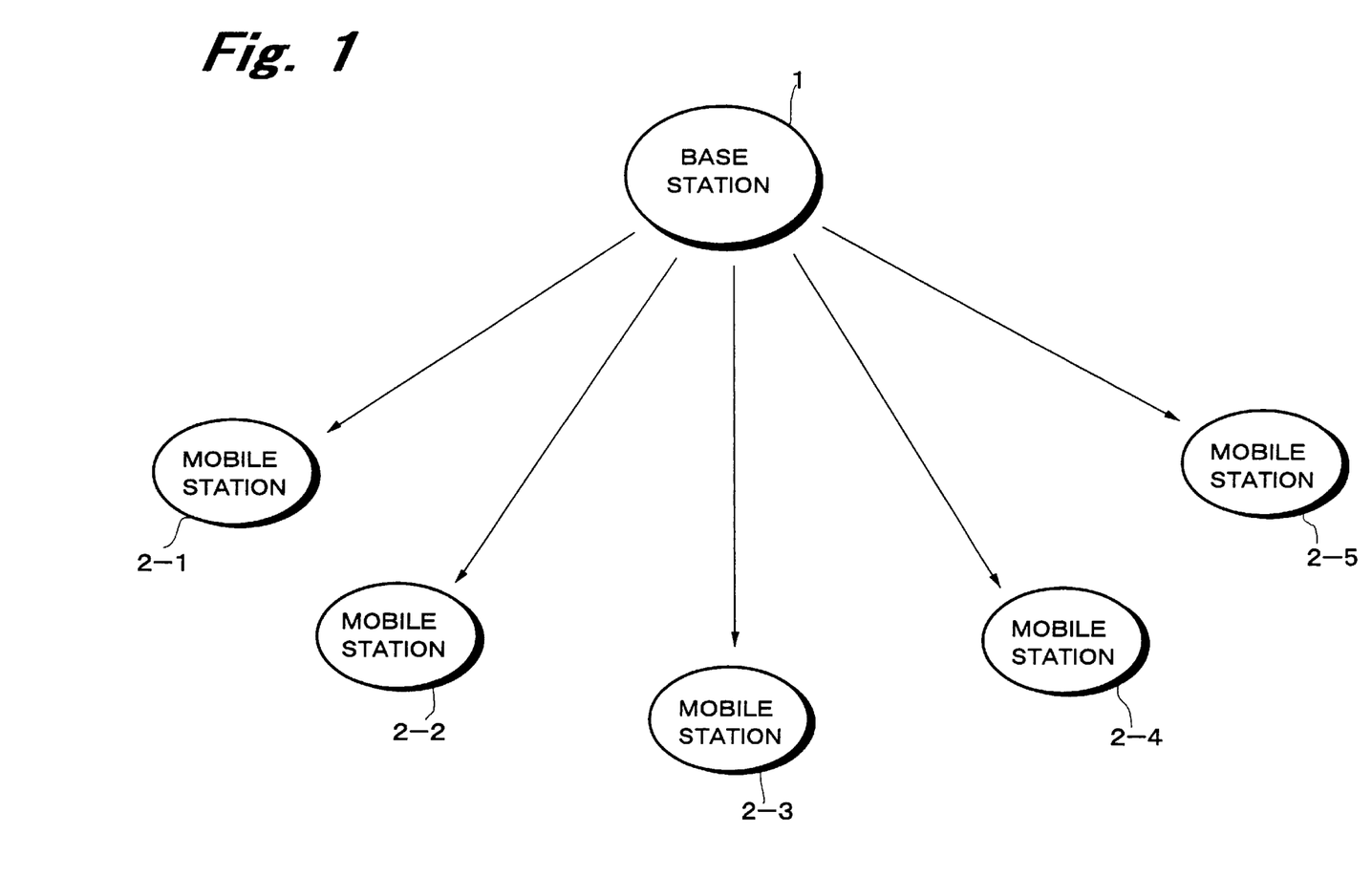
FIG. 1 is an illustration that shows a radio communication system according to the first embodiment of the invention.

Referring now to the drawings, particularly to FIG. 1, there is shown a radio communication system according to the present invention, which establishes communications using a spread spectrum system.

The radio communication system, as shown in the drawing, consists of a base station 1 and mobile stations 2-1, 2-2, 2-3, 2-4, and 2-5. The base station 1 monitors and controls communications between the mobile stations 2-1 to 2-5. For example, the base station 1 receives a call request from one of the mobile stations 2-1 to 2-5 and transfer the call request to another one of the mobile stations 2-1 to 2-5.

Figure 2:
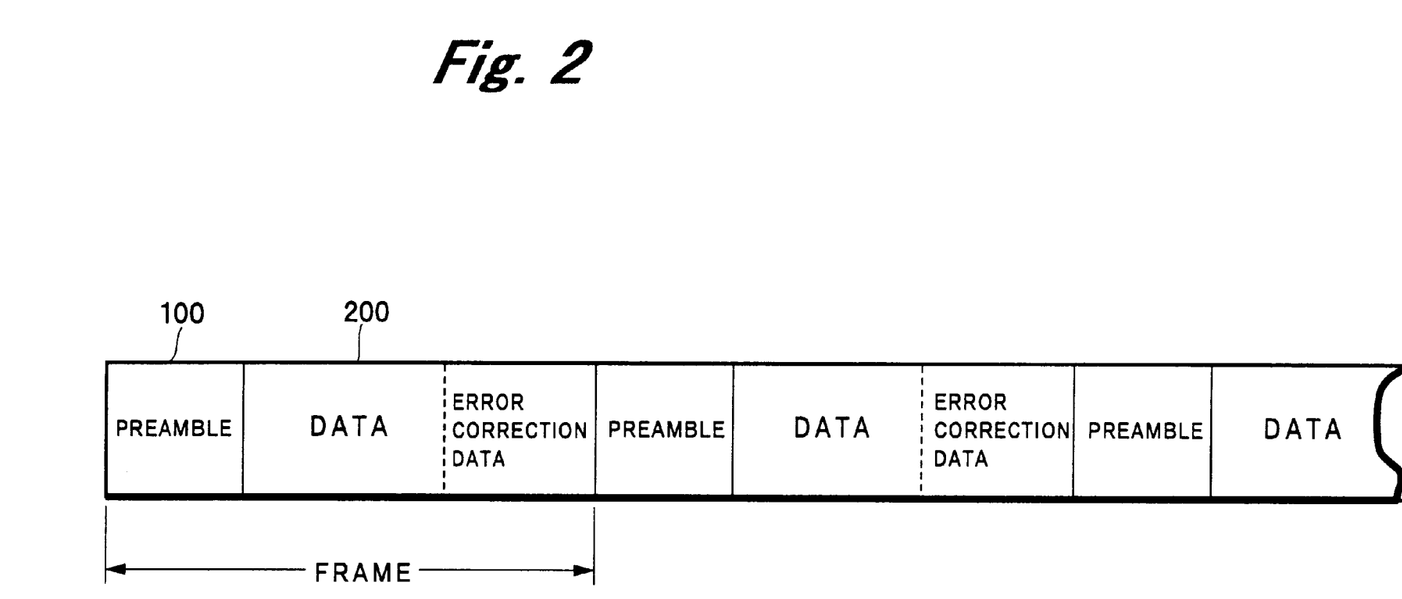
FIG. 2 is an illustration showing a frame structure.

In order to transfer the call request, the base station 1 transmits frames, as shown in FIG. 2, to the mobile stations 2. One frame consists of, for example, a preamble 100 and a data slot 200. The preamble is used for double spreading in which spectrum spreading is implemented twice, thereby improving the processing gain, or signal-to-noise ratio. This avoids reduction in reliability of the preamble 100 itself due to the noise. To the preamble 100, data indicative of the presence of the paging data (referred to as the first data below) is added. To the data slot 200, the paging data to be transmitted and received and data required for error correction of the paging data are added.

The length of each frame is fixed. Thus, establishment of synchronization between the base station 1 and the mobile stations 2-1 to 2-5 allows the mobile stations 2-1 to 2-5 to extract only the preamble or the data slot.

Figure 3:
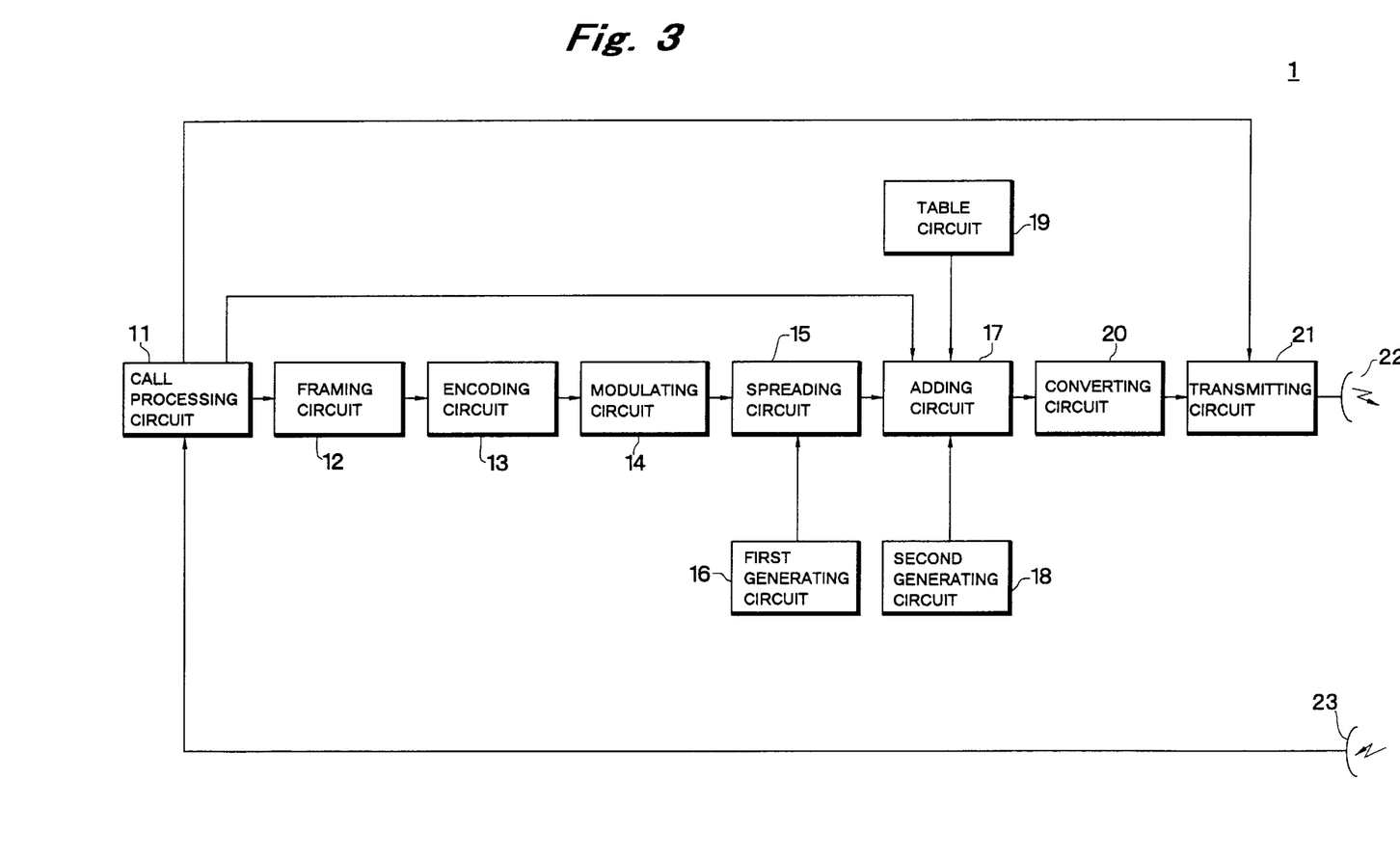
FIG. 3 is a block diagram showing a base station.

The base station 1, as clearly shown in FIG. 3, consists of a call processing circuit 11, a framing circuit 12, an encoding circuit 13, a modulating circuit 14, a spreading circuit 15, a first generating circuit 16, an adding circuit 17, a second generating circuit 18, a table circuit 19, a converting circuit 20, a transmitting circuit 21, and antennas 22 and 23.

Figure 4A:
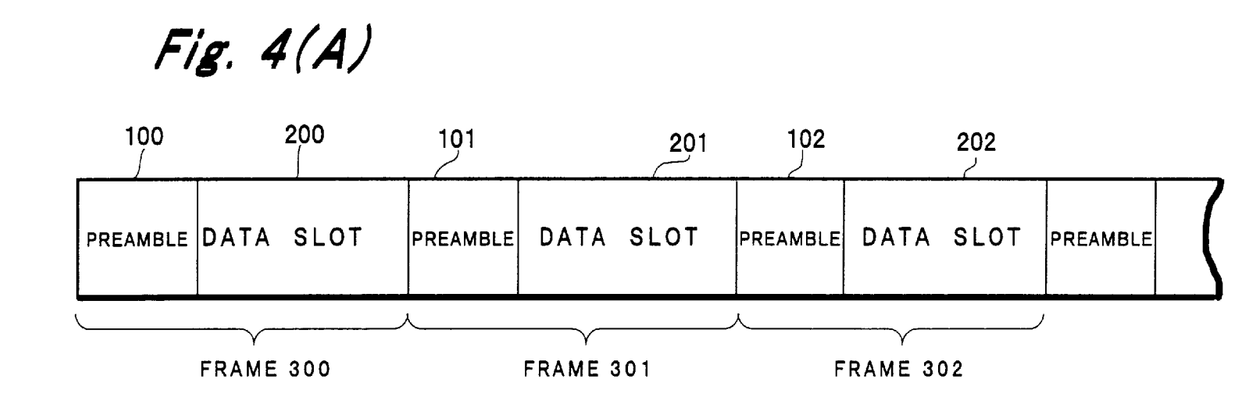
FIG. 4(A) is an illustration showing a frame structure.

The call processing circuit 11 receives call requests from the mobile stations 2-1 to 2-5 through the antenna 23. When a call request is made, the framing circuit 12 and the adding circuit 17 set first data indicative of the presence of the paging data in the preamble and also set the paging data in the data slot. For example, assuming that the framing circuit 12 sets, as shown in FIG. 4(A), the paging data in the data slot 201, the adding circuit 17 adds the first data to the preamble 101 in the same frame 301 or to the data slot 200 of the preceding frame 300. When there is no call request, the framing circuit 12 does not set the paging data in the data slot, and the adding circuit 17 sets in the preamble the first data indicative of the absence of the paging data.

Figure 4B:
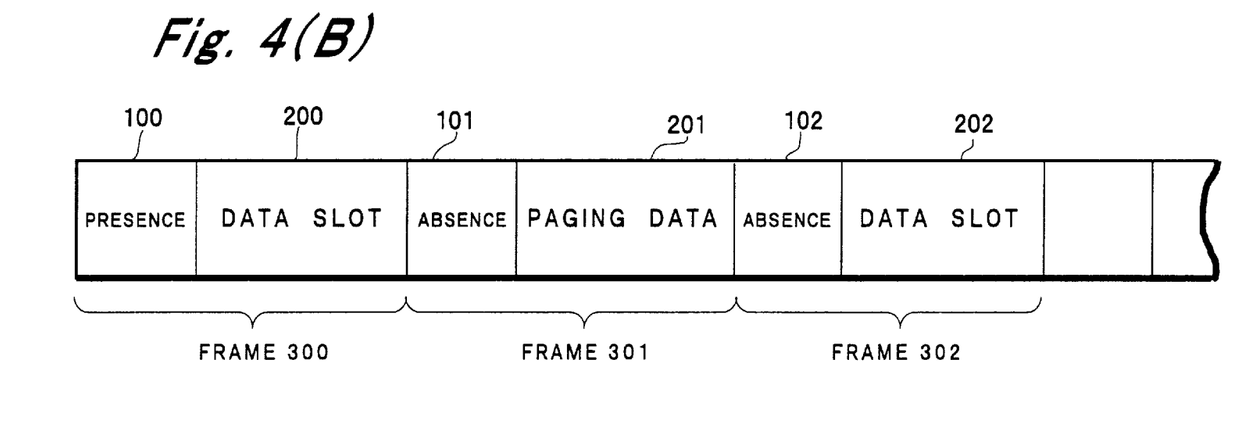
FIG. 4(B) is an illustration showing a frame structure.

In the following discussion, it is assumed that the paging data is, as shown in FIG. 4(B), provided to the data slot 201, the first data indicative of the presence of the paging data is provided to the preamble 100, and the first data indicative of the absence of the paging data is provided to the preambles 101 and 102. In other words, "Presence" in the preamble 100 of the frame 300 represents the presence of the paging data in the following frame 301. "Absence" in the preamble 101 of the frame 301 represents the absence of the paging data in the following frame 302. Similarly, "Absence" in the preamble 102 of the frame 302 represents the absence of the paging data in a following frame (not shown).

The encoding circuit 13 performs an encoding operation for error correction of the paging data provided by the framing circuit 12. Error correction data is provided to the data slot. The encoding circuit 13 does not encode the data slot to which the paging data is not provided. Specifically, the error correction data is not provided to the data slot.

Whether the paging data is provided or not, the modulating circuit 14 uses all the frames to perform modulation such as FM or PCM. The spreading circuit 15 implements spectrum spreading of the modulated frames using the first PN code generated by the first generating circuit 16.

The adding circuit 17 looks up tables stored in the table circuit 19 to implement the spectrum spreading of only the preamble using the second PN code generated by the second generating circuit 18. The whole of the frames is spread by the spreading circuit 15, and only the preamble is further spread by the adding circuit 17, thereby producing the frames each consisting of the preamble spread twice and the data slot spread one time.

The converting circuit 20 converts the frequency of the produced frames from a baseband frequency to a high frequency. The transmitting circuit 21 amplifies the frequency-converted frames. All the frames are radiated from the antenna 22 to the mobile stations 2-1 to 2-5.

Figure 5:
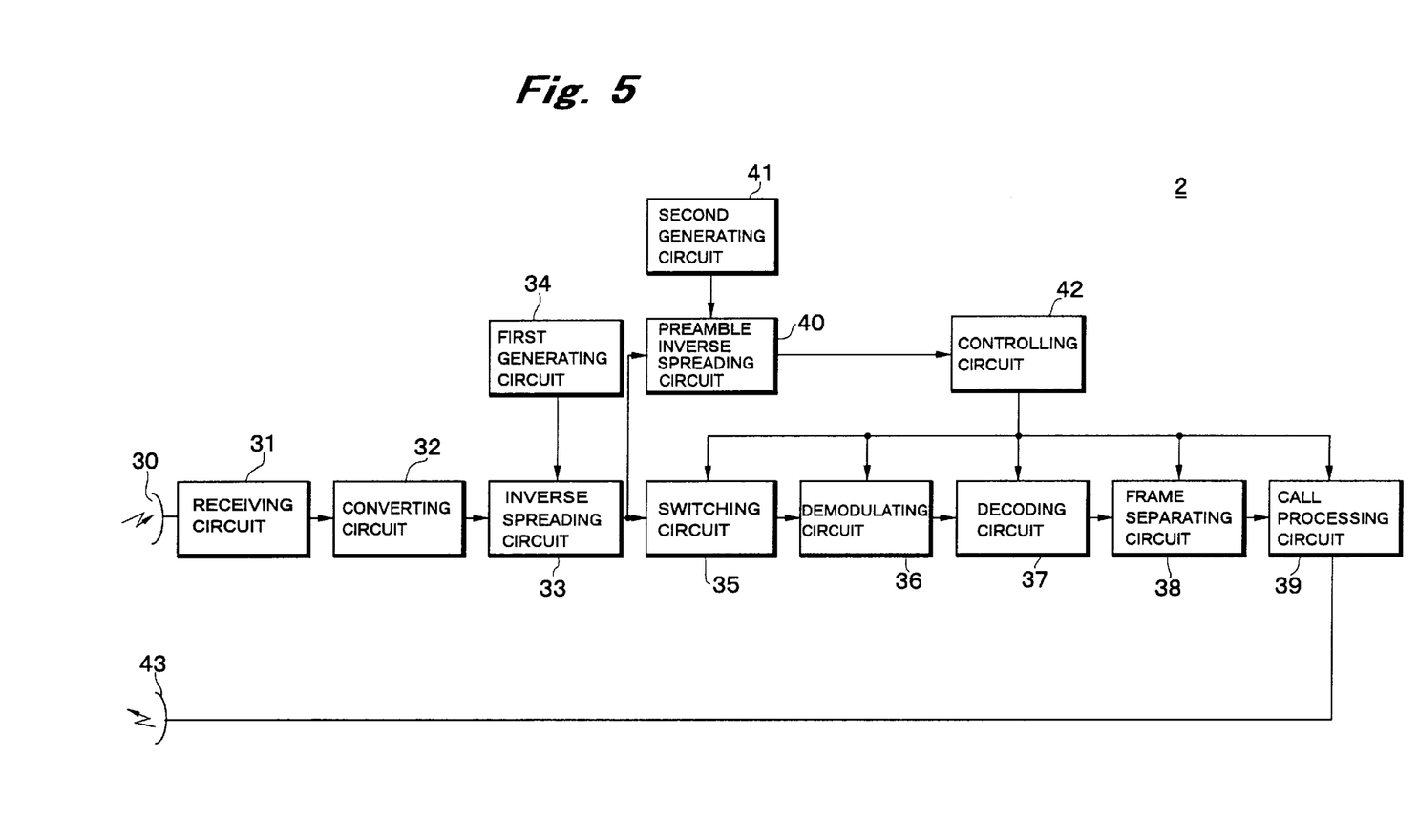
FIG. 5 is a block diagram showing a structure of each mobile station.

Each of the mobile stations 2-1 to 2-5 includes, as shown in FIG. 5, an antenna 30, a receiving circuit 31, a converting circuit 32, an inverse spreading circuit 33, a first generating circuit 34, a switching circuit 35, a demodulating circuit 36, a decoding circuit 37, a frame separating circuit 38, a call processing circuit 39, a preamble inverse spreading circuit 40, a second generating circuit 41, and a controlling circuit 42, and an antenna 43.

The antenna 30 receives the frames transmitted from the base station 1. The receiving circuit 31 amplifies the received frames. The converting circuit 32 converts the frequency of each frame from the high frequency to the baseband frequency. The inverse spreading circuit 33 establishes the acquisition using the PN code generated by the first generating circuit 34. The first generating circuit 34 includes, for example, a matched filter and a sliding correlator. If the PN codes generated by the first generating circuit 16 and the second generating circuit 18 of the base station 1 are defined as PN1 and PN2, respectively, and any PN code is defined as PN3, then PN2=PN1*PN3. The PN code generated by the first generating circuit 34 of the mobile station is identical with PN1.

The switching circuit 35 supplies only ones of the inversely spread frames containing the paging data to the demodulating circuit 36 under control of the controlling circuit 42, which analyzes the first data in the preambles of all the frames. Specifically, when the controlling circuit 42 analyzes, for example, the preamble 100 of the received frame 300 and determines that the following frame 301 contains the paging data, it connects the switching circuit 35 to the demodulating circuit 36, thereby supplying the frame 301 containing the paging data to the demodulating circuit 36.

The demodulating circuit 36, the decoding circuit 37, and the frame separating circuit 38 are reverse in operation to the modulating circuit 14, the encoding circuit 13, and the framing circuit 12 of the base station 1, respectively. Specifically, the demodulating circuit 36 demodulates the data slot. The decoding circuit 37 decodes the paging data in the demodulated data slot for error correction. The frame separating circuit 38 extracts the paging data from the data slot. The call processing circuit 39 analyzes the extracted paging data to acquire information on a call. The call processing circuit 39 performs necessary processing according to the contents of the information.

Turning on and off of the switching circuit 35, the modulating circuit 36, the decoding circuit 37, the frame separating circuit 38, and the call processing circuit 39 is controlled by the controlling circuit 42. Specifically, when the frame containing the paging data is received, that is, when the switching circuit 35 is connected to the demodulating circuit 36, the decoding circuit 37, the frame separating circuit 38, and the call processing circuit 39 are allowed to operate. Alternatively, when the frame not containing the paging data is received, that is, when the switching circuit 35 is disconnected from the demodulating circuit 36, the decoding circuit 37, the frame separating circuit 38, and the call processing circuit 39 are prohibited from operating.

The preamble inverse spreading circuit 40 inverse-spreads the received frames using the PN code generated by the second generating circuit 41. The second generating circuit 41, like the first generating circuit 34, includes a matched filter and a sliding correlator. The PN code generated by the second generating circuit 41 is identical with the above-described PN code PN3. The preambles of the inverse-spread frames are analyzed by the controlling circuit 42.

As described above, in the radio communication system of this embodiment, the base station 1 transmits to the mobile stations 2 the frames containing not only the paging data, but also the first data indicative of the presence or absence of the paging data. In each of the mobile stations 2-1 to 2-5, the controlling circuit 42 analyzes the first data in the received frames and allows the paging data processing circuit, that is, the demodulating circuit 36, the decoding circuit 37, the frame separating circuit 38, and the call processing circuit 39, to operate only when the first data indicates the presence of the paging data. In other words, as long as the received frames do not contain the paging data, the demodulating circuit 36, the decoding circuit 37, the frame separating circuit 38, and the call processing circuit 39 are prohibited from operating. This holds the mobile stations 2-1 to 2-5 waiting for a call request or incoming call from activating the demodulating circuit 36, the decoding circuit 37, the frame separating circuit 38, and the call processing circuit 39 at all times regardless of presence or absence of the paging data, thus resulting in a decrease in power consumption. Since the mobile stations 2-1 to 2-5 are usually supplied with power from a dry battery, the decrease in power consumption is good for the mobile stations 2-1 to 2-5.

In the radio communication system of the above described embodiment, the first data is added to the preamble undergoing the double spreading for improving the processing gain, thereby allowing the first data to be transmitted and received with a decreased possibility of errors. In other words, the first data may be transmitted and received at high confidence levels without encoding and decoding for error correction, thereby allowing the presence or absence of the paging data to be determined with high accuracy.

In the radio communication system of the above-described embodiment, the power required for the transmitting circuit 21 to transmit the frames is constant. In contrast, a decrease in power consumption of the base station 1 is accomplished by increasing only the power required for the transmitting circuit 21 to transmit the preamble and the data slot containing the paging data while decreasing other transmission power. The transmitting circuit 21 is supplied with sufficient power from a generator, but the base station must transmit the frames accurately to any of the mobile stations within an area covered by the base station so that the output power of the transmitting circuit 21 is usually great. Thus, the decrease in power consumption of the base station 1 is good for the base station 1 from the viewpoint of decrease in running cost.

Figure 6:
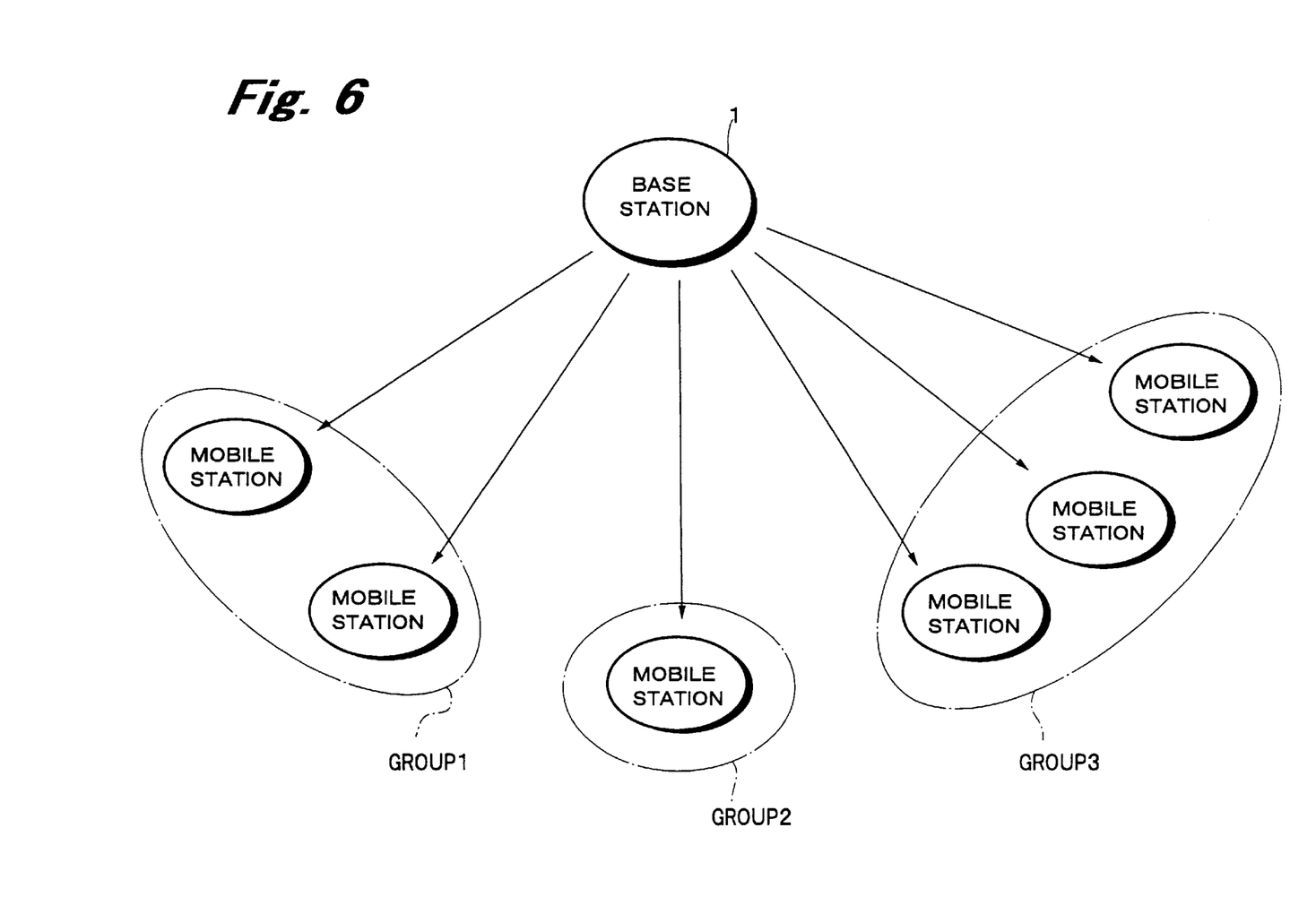
FIG. 6 is an illustration showing a radio communication system according to the second embodiment of the invention.

In the above-described embodiment, conditions for transmission between the base station and the mobile stations are identical with each other. The need may, however, arise for changing the conditions for transmission between the mobile stations and the base station so that they are different from each other because of difference in telephone charge between the mobile stations. Therefore, in a second embodiment of the invention, the mobile stations are, as shown in FIG. 6, classified into several groups in terms of, for example, the transmission time zone and the frequency of transmissions. The table circuit 19 stores a table listing the relation between group numbers and the mobile stations for transferring the first data and the paging data to each of the groups.

Figure 7:
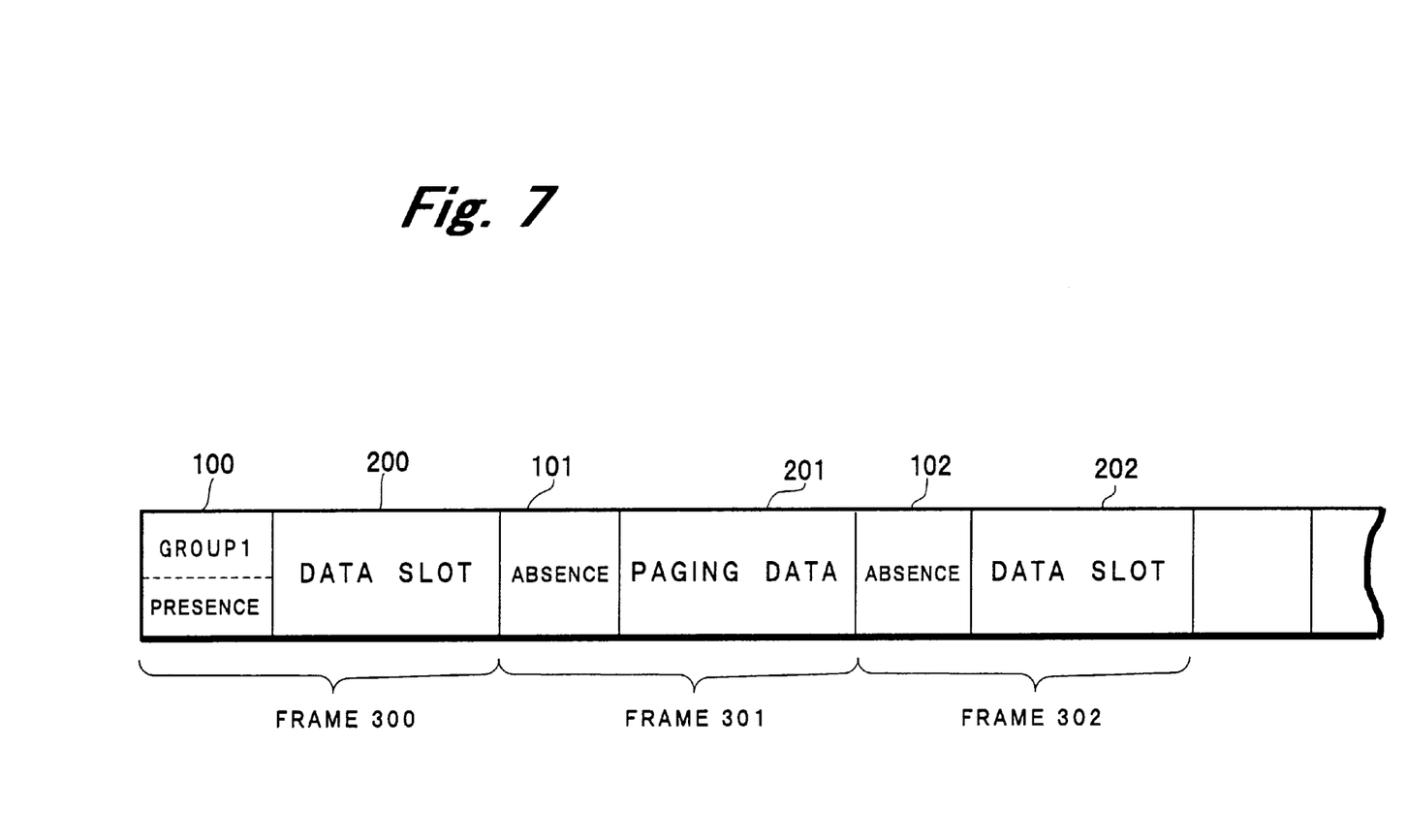
FIG. 7 is an illustration showing a frame structure.

For example, if a call is made to one of the mobile stations in the group 1, then the adding circuit 17 of the base station 1 looks up the table circuit 19 to find the group number 1 assigned to the group of the called mobile station. The adding circuit 17 adds to the preamble 100 the first data indicating the group number 1 and the presence of the paging data and provides the paging data on the incoming call to the data slot 201 to produce the frames 300 and 301 as shown in FIG. 7. The controlling circuits 42 of not only the mobile stations of the group 1, but also the mobile stations of the other groups analyze the preamble 100 of the received frame 300. The mobile stations of the other groups readout the group number 1 from the preamble 100 and determine that the received frames 300 and 301 are not for themselves, while the mobile stations of the group 1 determine that the received frames 300 and 301 are provided to themselves. The controlling circuit 42 of each of the mobile stations of the groups other than the group 1 prohibits the call processing circuit 39 from operating, while the controlling circuit 42 of each of the mobile stations of the group 1 allows the call processing circuit 39 to operate.

The radio communication system of the second embodiment classifies the mobile stations into a plurality of groups. Upon input of a call signal, the base station adds not only the first data indicating the presence of the paging data, but also the group number of the group of the called mobile station to the preamble. All the mobile stations analyze the preamble, but only ones belonging to the group of the called mobile station analyze the paging data. This results in a further decrease in power consumption of the mobile stations as compared with the first embodiment.

Instead of the group number indicative of one of the groups to which the called mobile station belongs, one of mobile station numbers unique to the mobile stations which indicates the called mobile station may be added to the preamble to allow only the called mobile station to analyze the paging data, thereby decreasing the total power consumed by the whole of the mobile stations.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments that can be embodied without departing from the principle of the invention as set forth in the appended claims.

What is claimed is:

1. A radio communication system comprising:
   a plurality of sub-transmission units; and
   a main transmission unit transmitting to the sub-transmission units simultaneously a frame including a data slot to which paging data on a call made by one of the sub-transmission units to another is added and a preamble to which a bit stream to be subjected to double spreading is added for informing the sub-transmission units of a call request, wherein said main transmission unit includes an adding circuit adding to said preamble first data indicating the presence or absence of the paging data, a double spreading circuit subjecting data located in said preamble to the double spreading, and a transmission circuit transmitting said frame to which the first data is added to said sub-transmission units simultaneously, and wherein each of said sub-transmission units includes a receiving circuit receiving said frame from said main unit, an inverse double spreading circuit subjecting data located in said preamble within the received frame to inverse double spreading, a decision circuit for deciding whether said first data indicates the presence of the paging data or not, a reproducing circuit reproducing said paging data of the received frame, and a switching circuit turning on said reproducing circuit when said first data indicates the presence of said paging data.

2. A radio communication system as set forth in claim 1, wherein said switching circuit keeps said reproducing circuit turned on during a time when said reproducing circuit receives the data slot containing said paging data.

3. A radio communication system as set forth in claim 1, wherein said main transmission unit further includes an amplifying circuit that amplifies said frame, an amplification of the data slot within which said paging data is provided being smaller than that of the data slot within which the preamble and the paging data are not provided.

4. A radio communication system as set forth in claim 1, wherein data for error correction of said paging data is added to said data slot.

5. A radio communication system as set forth in claim 1, wherein said sub-transmission units are classified into a plurality of groups, said adding circuit adding to said preamble second data indicative of one of the groups to which said other sub-transmission units belong, only the sub-transmission units belonging to the one of the groups indicated by the second data reproducing said paging data.

6. A radio communication system as set forth in claim 1, wherein said adding circuit adds second data specifying said other sub-transmission units to said preamble, each decision circuit deciding which of said sub-transmission units said second data specifies, only the reproducing circuits in said other sub-transmission units reproducing said paging data.

* * * * *